J. A. COROTTO & A. A. ZOLEZZI.
NUT LOCK.
APPLICATION FILED MAY 5, 1915.

1,168,860.

Patented Jan. 18, 1916.

WITNESSES:
Charles Pickles
Thos Eastberg

INVENTORS,
John A. Corotto
Adolph A. Zolezzi
BY G. H. Strong.
ATTORNEY

UNITED STATES PATENT OFFICE.

JOHN A. COROTTO, OF SAN JOSE, AND ADOLPH A. ZOLEZZI, OF SUNNYVALE, CALIFORNIA.

NUT-LOCK.

1,168,860.  Specification of Letters Patent.  Patented Jan. 18, 1916.

Application filed May 5, 1915. Serial No. 25,964.

*To all whom it may concern:*

Be it known that we, JOHN A. COROTTO, of San Jose, county of Santa Clara, and State of California, and ADOLPH A. ZOLEZZI, of Sunnyvale, county of Santa Clara, and State of California, citizens of the United States, have invented new and useful Improvements in Nut-Locks, of which the following is a specification.

Our invention relates to improvements in nut locks, and is especially designed for adjustment upon the connecting bars at the meeting ends of railway rails.

It consists of a forked shoe, the fork of which is adapted to fit the nut and the tang or extension of which serves to retain the fork in position, in conjunction with a cotter pin which may be used therewith, and it further consists in the novel formation of a nut to which the locking bar is fitted and by which it is retained in position.

Figure 1:
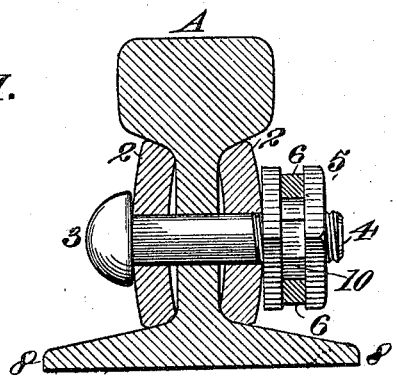
Figure 2:
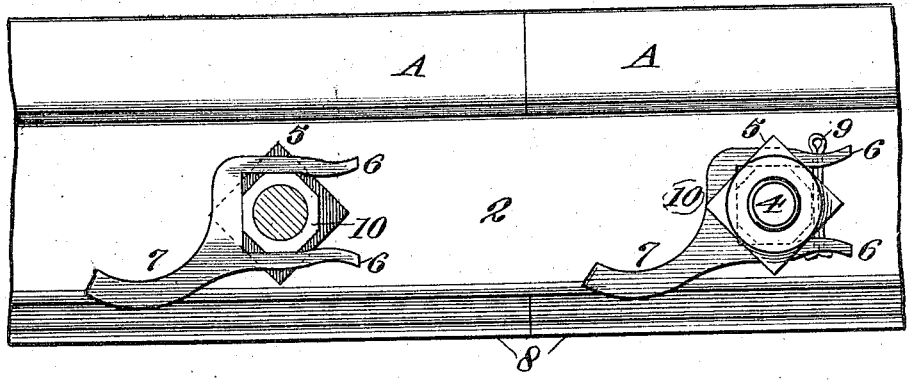
Figure 3:
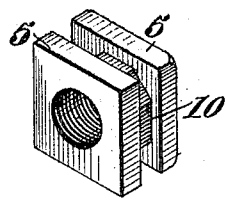
Figure 4:
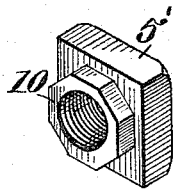

Referring to the accompanying drawings for a more complete explanation of our invention:—Figure 1 is a cross sectional view of a rail and fish-bars on each side, with the bolt, and the nut in elevation and the fork in section. Fig. 2 is a side elevation of the same, showing the locking device in position. Fig. 3 is a perspective view of the nut; and Fig. 4 is a perspective view of a modified form of nut.

The well known difficulty of securing fish-bars to the meeting ends of railway rails is caused by the constant jar which is caused by the passing of trains which loosens the nuts from the bolts however tight they may be secured.

In our device, A is an end view of a railway rail, 2—2 are fish-bars arranged upon each side of the rail shank extending across the meeting ends of two rails, 3 is the bolt head, and 4 is the end of the bolt projecting through the fish-bar to a length sufficient to receive the nut 5 which clamps the two fish-bars together.

In order to retain the nut, when it has been screwed up, we have shown a locking device which consists of two substantially parallel and elastic arms 6. These arms are separated sufficiently to fit the nut which is constructed as will be hereinafter explained. The arms 6 unite with a curved extended tang 7 which is adapted to rest upon the flange 8 of the rail. When the nut has been turned into locking position, the ends of the spring plates may extend far enough beyond the nut so that a cotter or other locking pin 9 may be extended through them.

The nut, as here shown, consists of either one 5' or two, preferably rectangular, parts 5 and a smaller portion 10 which may be hexagonal or octagonal in shape. This small portion may be formed either between the parts 5 of the nut, as shown in Fig. 3, or at one side of the single rectangular portion 5', as shown in Fig. 4. The distance between the two parts 5 or the distance from a single part 5 and the face against which the part 10 abuts, when screwed up, is such that the parallel, elastic arms 6 of the locking device may pass between the rectangular portions of the nut and clasp the smaller polygonal portion 10. This construction of the nut allows for its being turned until it is sufficiently tight, and by reason of the number of parallel faces in the octagonal portion of the nut, the locking arms will fit an opposed pair of these locking faces which may be brought into position without regard to the general position of the rectangular portion of the nut. Thus if the nut is very nearly in the proper position, the arms may be forced over the two horizontally parallel sides of the octagon and the tail or extension 7 will bind against the flange 8 of the rail and thus prevent the turning and unlocking of the nut. The introduction of the cotter pins 9 will then make the device absolutely secure.

It will be noted that the tang 7 has a foot that is curved and which bears on the rail base being located below the plane of the lower arm 6, and at a considerable distance to the rear of the connection between the arms 6. This structure allows the arms 6 to give independently of the foot of tang 7 in positioning the lock, and provides a lock which is applied complete by a single movement namely, by placing the foot of tang 7 on the rail base and then sliding the device toward the nut with the arms 6 gripping two of the nut faces 10. In addition the lower arm is spaced from the rail base which allows the arm to freely give to engage the adjacent face 10, should that face, upon tightening of the nut not be in true parallelism with the rail base.

Having thus described our invention, what we claim and desire to secure by Letters Patent is—

In a nut lock in combination with a nut having opposed parallel flat parts formed independent of its wrench engaging faces, a locking device composed of a pair of spaced parallel spring arms having free outer ends adapted to be sprung by engagement with said parallel flat parts to receive the latter in the space between said arms, said arms being connected at their rear ends, and a tang secured to the connection between the rear ends of the arms and having a foot portion disposed considerably beyond and to the rear of said connection and below the plane of the lower arm and adapted to rest against an extraneous stationary part, the lower of said arms being disposed in spaced relation to the extraneous stationary part.

In testimony whereof we have hereunto set our hands in the presence of two subscribing witnesses.

JOHN A. COROTTO.
ADOLPH A. ZOLEZZI.

Witnesses:
JOHN H. HERRING,
W. W. HEALEY.

Copies of this patent may be obtained for five cents each, by addressing the "Commissioner of Patents, Washington, D. C."